United States Patent [19]

Mickowski

[11] Patent Number: 4,504,920

[45] Date of Patent: Mar. 12, 1985

[54] DATA ANALYSIS AND DISPLAY METHOD FOR RECIPROCATING EQUIPMENT IN INDUSTRIAL PROCESSES

[76] Inventor: John Mickowski, 129 Main St., Franklin, N.J. 07416

[21] Appl. No.: 292,168

[22] Filed: Aug. 12, 1981

[51] Int. Cl.³ .................. G01D 3/08; G06F 15/46
[52] U.S. Cl. .................... 364/550; 364/476; 364/551; 364/552; 364/521; 340/724; 340/734; 425/169
[58] Field of Search ............. 364/550, 551, 552, 476, 364/521; 340/709, 722, 724, 732, 734, 745; 425/149, 150, 169, 171

[56] References Cited

U.S. PATENT DOCUMENTS

| | | | |
|---|---|---|---|
| 3,818,201 | 6/1974 | Hartwich et al. | 364/551 X |
| 3,911,419 | 10/1975 | Bates et al. | 340/709 |
| 3,982,440 | 9/1976 | Groleau et al. | 364/552 X |
| 4,094,940 | 6/1978 | Hold | 364/476 X |
| 4,249,186 | 2/1981 | Edwards | 364/550 X |

Primary Examiner—Errol A. Krass
Assistant Examiner—Kevin J. Teska
Attorney, Agent, or Firm—Eugene Lieberstein

[57] ABSTRACT

The data analysis and display system of the present invention utilizes a microcomputer in combination with a CRT and a multiplicity of transducers for monitoring process parameters in the operation of a reciprocating device having a linear stroke. A profile of the process parameters are generated as a function of stroke length, stored in a non-volatile memory and graphically displayed on the CRT as master traces for comparison with current data profiles.

6 Claims, 14 Drawing Figures

DATA ANALYSIS AND DISPLAY METHOD FOR RECIPROCATING EQUIPMENT IN INDUSTRIAL PROCESSES

Various industrial processes employ reciprocating machinery having a linear stroke to implement the process. In die casting and plastic molding, for example, the linear reciprocating device is an hydraulic cylinder used for loading raw material into the die or mold respectively. In die casting, molten metal is forced into the die from the hydraulic cylinder by a piston type plunger or ram displaced over a linear stroke under controlled operating conditions of pressure and velocity. Research in die casting has achieved a level of sophistication whereby the proper injection speeds, pressure and temperatures required for optimum operation for any given machine can be theoretically calculated. To satisfy the calculated conditions, the operation must be carried out within narrow ranges of settings for each of the critical process parameters. Variation in one or more of the process parameters will affect the performance of the other parameters on the process and will alter the production rate and affect the yield of the product produced. To optimize the production output the process parameter settings are adjusted over a series of production runs until a product with desired characteristics and production yield is obtained. Since the events which affect the production cycle occur much too quickly for human observation it was necessary, heretofore, for operating personnel to make subjective judgements in adjusting process parameters in a production run frequently resulting in high scrap rates. The trail and error technique commonly used heretofore also required more raw material than necessary in getting a given required production output. Moreover, because of the inability to control and adjust the process parameters accurately, the design of the article produced typically had to be made with more material than necessary for functional or strength considerations simply to permit an acceptable yield.

Accordingly, a need exists for a diagnostic instrumentation system which can readily be applied to the process machinery to monitor and record objective measurements of machine performance during an actual production cycle. The objective measurements should represent machine operational data which will provide technical personnel with the means to make appropriate adjustments to maintain optimum process integrity. Prior art instrumentation claiming to satisfy this need are based upon the use of high speed analog graphic plotters which typically use expensive ultraviolet sensitive photographic paper in combination with transducers and signal conditions designed to collect machine data and display it. One of the major disadvantages to the use of a graphic plotter is that its output is a graphical display of the given parameter under observation versus time. A time display is difficult to interpret and requires sophisticated expertise to derive and calculate quantitative values for the critical parameters affecting the process. Not only is the interpretation subject to error but it does not provide readily apparent information from which machine adjustments may be made in the next production cycle. Another significant disadvantage is that the oscillographs must be adjusted to accommodate the transducers used on a specific machine and must be calibrated for each different type of transducer. Also, because of the high speed of the paper travel of the recorder it is necessary for a technical person to be constantly attentive of the oscillograph so as to minimize the waste of the expensive paper. In accordance with the method of the present invention a profile of the critical operational parameters in a die casting operaion, viz., velocity and pressure are generated as a function of the ram position along its linear stroke. This permits dramatically reduced set up time and readily provides information for adjustment of the variable parameters within precise limits to assure maximum production quality and performance. The method of the present invention comprises the steps of: dividing the stroke length traversed by the ram into a predetermined number of incremental positions; generating analog data corresponding to the position of the ram and the pressure developed by the ram at each such incremental position; recording the time transpired in the movement of the ram along the stroke length; calculating the velocity of the ram at each incremental position, graphically displaying the data corresponding to pressure and velocity on a display screen of a cathode ray tube as a function of the incremental position of the ram along the stroke length until the velocity reaches a predetermined minimum level, with the display forming a master profile for such data; storing the data representing the master profile at a predetermined address location in a nonvolatile memory of a microcomputer; repeating the sequence of generating, calculating and storing analog data corresponding to pressure and velocity as a function of stroke length for a second die casting operation to form a current profile of such data and displaying said current profile on the display screen along with the master profile for comparison purposes. The best mode for practicing the present invention is described hereafter at length in connection with the system shown in FIGS. 1–7.

It is the principal object of the present invention to provide a method for generating a profile of at least one process parameter in the control of a reciprocating device having a linear stroke as a function of stroke position.

It is an even further object of the present invention to provide a method adapted to store in a non-volatile memory of a microcomputer a profile recording of a master trace for a given control parameter so as to provide for the superposition of a current profile of such control parameter upon the master trace.

It is yet a further object of the present invention to provide a method for generating on a cathode ray tube the profile of at least one process parameter affecting the operation of a reciprocating device having a linear stroke as a function of stroke position and for generating a cursor for providing quantitative information of such process parameter at any cursor position along said profile.

Other objects and advantages of the present invention will become apparent from the following detailed description of the invention when read in conjunction with the accompanying drawings of which:

Figure 1:
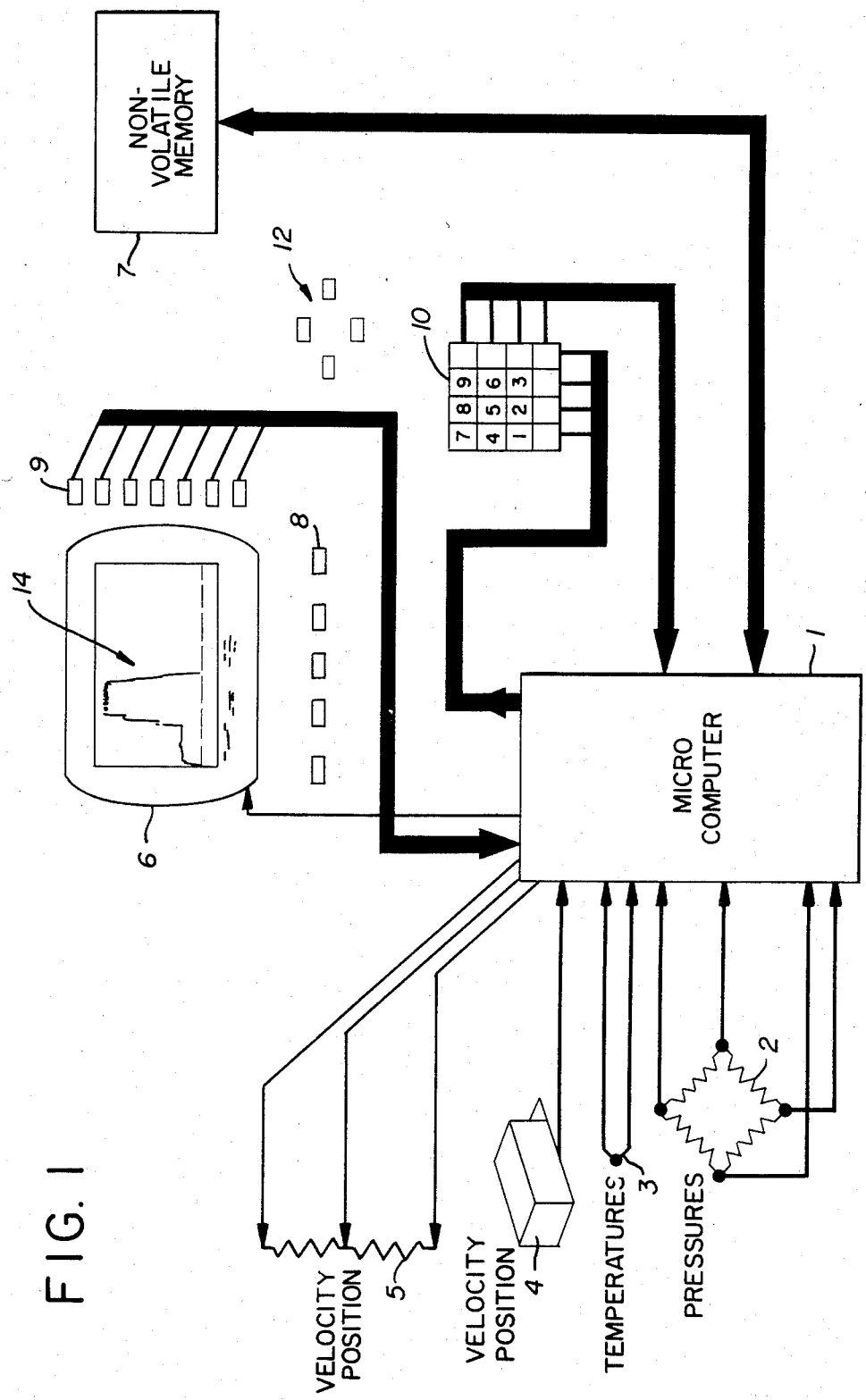
FIG. 1 is a block diagram of the data analysis and display system of the present invention.
Figure 1A:
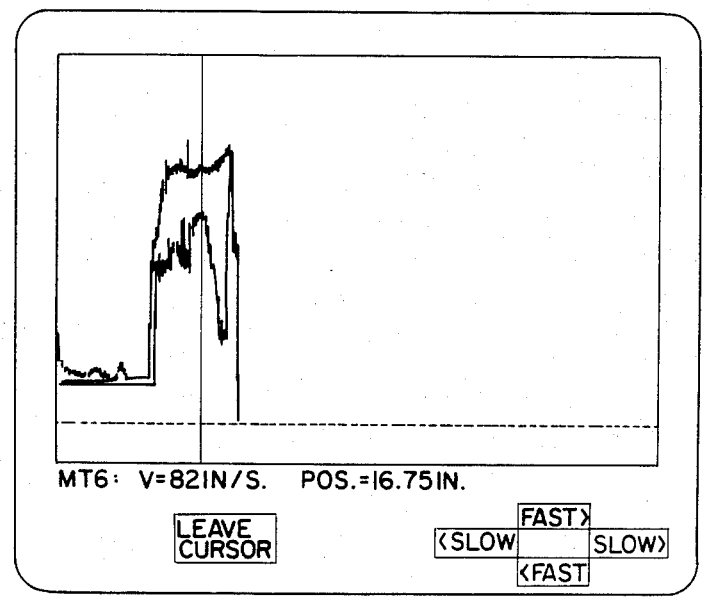
FIG. 1A is a pictorial representation of a typical profile display of velocity versus position generated in accordance with the present invention for a die casting operation.

Referring now in particular to FIG. 1 and FIG. 1A inclusive which diagrammatically illustrate the data analysis and display system of the present invention and a typical CRT (cathode ray tube) velocity profile generated by the system of the present invention for a die casting machine.

The basic building blocks of the data analysis and display system of the present invention comprise a microcomputer 1 of any conventional design, including a conventional non-volatile memory 7, groups of program selection and function keys 8, 9 and 12 and a numeric keyboard 10; a plurality of transducers 2, 3, 4 and 5 respectively and a conventional cathode ray tube 6 hereinafter referred to as a CRT.

The transducers 2, 3, 4 and 5 represent pressure, temperature and velocity position transducers respectively. Transducers 4 and 5 represent alternative transducers for providing velocity position data to the microprocessor. Transducer 4 is a conventional digital type transducer connected to the die casting machine to sense the pulses generated during machine production in response to each incremental movement of the reciprocating device (not shown) over its linear stroke. The output is in a binary coded decimal format for direct reading by the microcomputer 1. The transducer 5 is a linear potentiometer having an interface circuit as will be discussed in more detail with reference to FIG. 4. The microcomputer 1 may interface to either the digital velocity position transducer 4 or the linear potentiometer velocity position transducer 5. The temperature transducer 3 is a temperature thermocouple having an interface circuit as will be discussed in more detail with reference to FIG. 3 whereas the pressure transducer 2 is a conventional strain gage type pressure transducer in a bridge configuration with an interface circuit as will be discussed in more detail with reference to FIG. 2.

Each of the transducers 2, 3, 4 and 5 collect data consisting of velocity, temperature and pressure as a function of stroke position and time during a production cycle. The production cycle for a die casting or plastic molding operation is defined for purposes of the present invention as the stroke and a short period of time after the stroke ends, and corresponds to the motion of the injection ram (not shown) which injects either metal into the die or plastic into a mold respectively. The stroke length represents the total displaced distance of the injection ram in the hydraulic cylinder for a single production cycle.

The conventional microcomputer 1 is connected to a conventional CRT 6 for displaying a profile representative of the data collected by the transducer 2, 3, 4 or 5 in accordance with programmed instructions corresponding to the flow diagrams 5, 6, 6A–6F and 7 respectively as will be discussed in more detail hereafter. Any conventional software program format suitable for use with the microcomputer 1 may be used in the preparation of a program to fulfill the flow diagram requirements. The program itself does not form a part of the present invention and may readily be prepared by any skilled programmer from the flow diagrams.

An illustrated display of a typical profile 14 representative of the velocity of the injection ram for a production cycle as a function of stroke position, i.e., the position of the reciprocating injection ram along the stroke length, is shown on the CRT 6. A further illustrative display showing two velocity traces superimposed for comparison is shown in FIG. 1A. The microcomputer 1 is of any commercially available type which can generate a cursor. The position of the cursor 16 in FIG. 1A is controlled by software following the flow diagram subroutine for the cursor to be discussed hereafter in connection with FIG. 6C and FIG. 7. The cursor 16 is adjustable over the stroke length and provides specific parameter information corresponding to its location on the display thereby permitting the observer to readily compare parameter values between the superimposed traces at any stroke position. One of the superimposed traces may represent a "master" profile defined as an idealized or acceptable profile and may simply represent a previously recorded profile. A master profile is used for comparison purposes with a "current" profile. A current profile is defined as a profile trace formed on the CRT from data received by the microprocessor from one of the transducers in response to a current production cycle. The master profile is stored in the non-volatile memory 7. Any number of master profiles may be recorded and stored in the non-volatile memory 7 so as to constitute a library of master profiles. A master profile is stored at any address in memory 7 identified by the operator through the use of the numeric keyboard 10. By providing this ability to superimpose master profiles over a current profiles, a non-technically trained person can readily distinguish between a master trace identifying a production run classified as acceptable or good and the current production run representing the current profile. It also becomes readily apparent to the operator where and to what extent adjustment may be necessary to conform subsequent production runs to the master trace. This is primarily attributable to the fact that the trace is a function of position and not time. Individual program selection and funtion control is provided by groups of push buttons 8, 9 and 12. Each individual button in group 9 is assigned a program selection whereas the group of push buttons 8 and 12 are assigned individual function selections corresponding to the function selections in the flow diagrams. The numeric keyboard 10 additionally provides for the numeric entry of upper and lower limits for each important parameter so as to define the acceptable range of such parameter for proper operation of the machine. In addition, the numeric keyboard 10 may be used to enter data corresponding to a machine number, ram plunger diameter and production cycle job number which collectively are used for the file identification for each master trace stored in the non-volatile memory 7.

Figure 2:
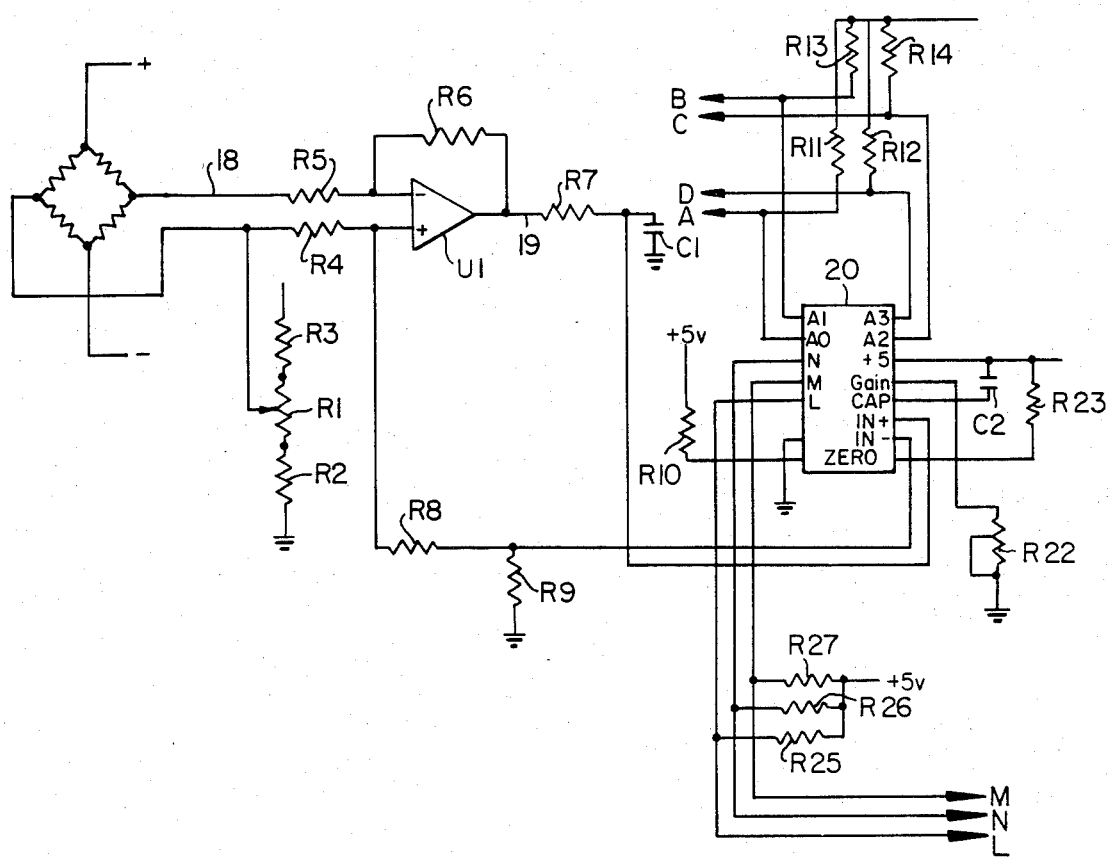
FIG. 2 shows the pressure interface circuit between the microcomputer of FIG. 1 and the pressure transducer.

FIG. 2 shows the pressure interface circuit between the microcomputer 1 and the pressure transducer 2. The pressure transducer 2 is of a conventional bridge type with one leg of the bridge being adjustable and varying in a conventional fashion in response to the amount of resistance to movement of the reciprocating device (not shown). Resistors R1, R2 and R3 form a zero offset adjustment network to cancel out the zero offset of the pressure transducer 2 so as to provide a zero differential input to the operational amplifier U1. Resistors R4, R5, R6, R8 and R9 form an appropriate feedback network to provide an output 18 of predetermined gain relative to the signal 19. RC network combination R7 and C1 reduce the noise content from the pressure transducer 2. Integrated circuit 20 is a commercially available analog to digital converter for converting the analog signal to a digital format preferably in BCD form. The resistors R11, R12, R13, R14, R25, R26 and R27 are pull up resistors for providing signals on lines A,D, B,C and MNL which are connected to provide the microcomputer 1 with continuous data corresponding to the pressure at the instant of time selected to be read by the microcomputer. The microcomputer 1 reads the pressure data in increments of time corresponding to the incremental displacement of the reciprocating device (not shown) over the stroke length to provide a profile of pressure versus stroke position. Resistors R10 and R23 are selected to cancel the zero offset of the analog to digital converter 20. Capacitor C2 is an integrating capacitor used by converter 20 during data conversion. Resistor R22 is used to adjust the gain of the converter 20 to result in a calibrated output.

Figure 3:
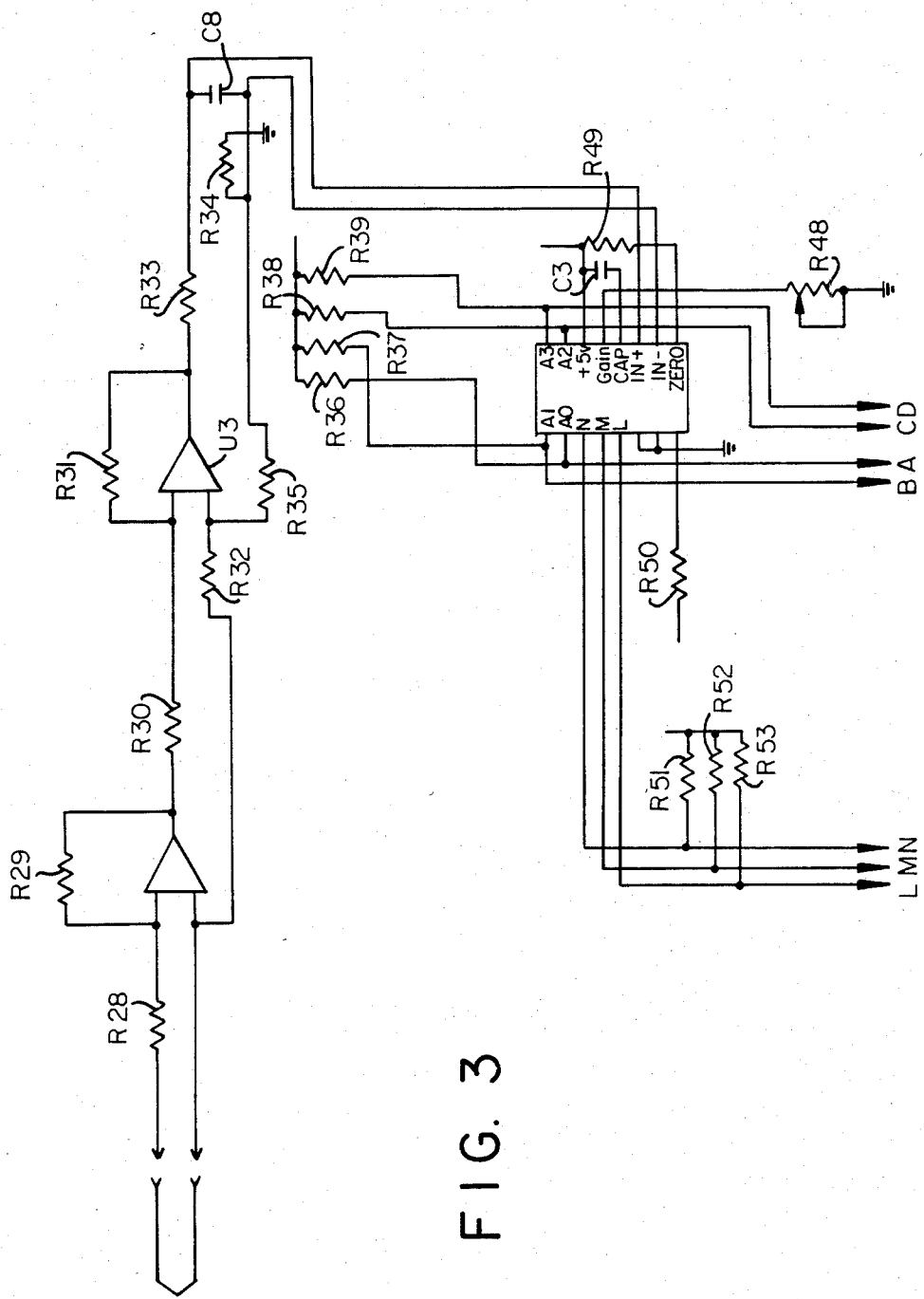
FIG. 3 shows the temperature interface circuit between the microcomputer of FIG. 1 and the temperature transducer.

FIG. 3 shows the temperature interface circuit between the temperature transducer 3 and the microcomputer 1. Thermocouple 41 is adapted to be coupled to the reciprocating device to provide a temperature signal corresponding to the temperature in the reciprocating device as a function of stroke position. The thermocouple 41 is connected through lead lines 25 and 26 to a conventional operational amplifier U2. Resistors R28 and R29 provide the feedback resistors for setting the gain of the first stage of amplification. A second stage of amplification is provided by a conventional operational amplifier U3 in conjunction with its feedback resistor network R30, R31, R32, R35 and R34. The output 30 from the second stage of amplification is fed relative to the potential on line 33 to a conventional analog to digital converter 32 in a manner similar to that in the interface circuit for the pressure transducer 2. The output from the analog to digital converter 32 is provided on the same lines L,M, N, A,B, C,D as for the pressure transducer circuit in FIG. 2.

Figure 4:
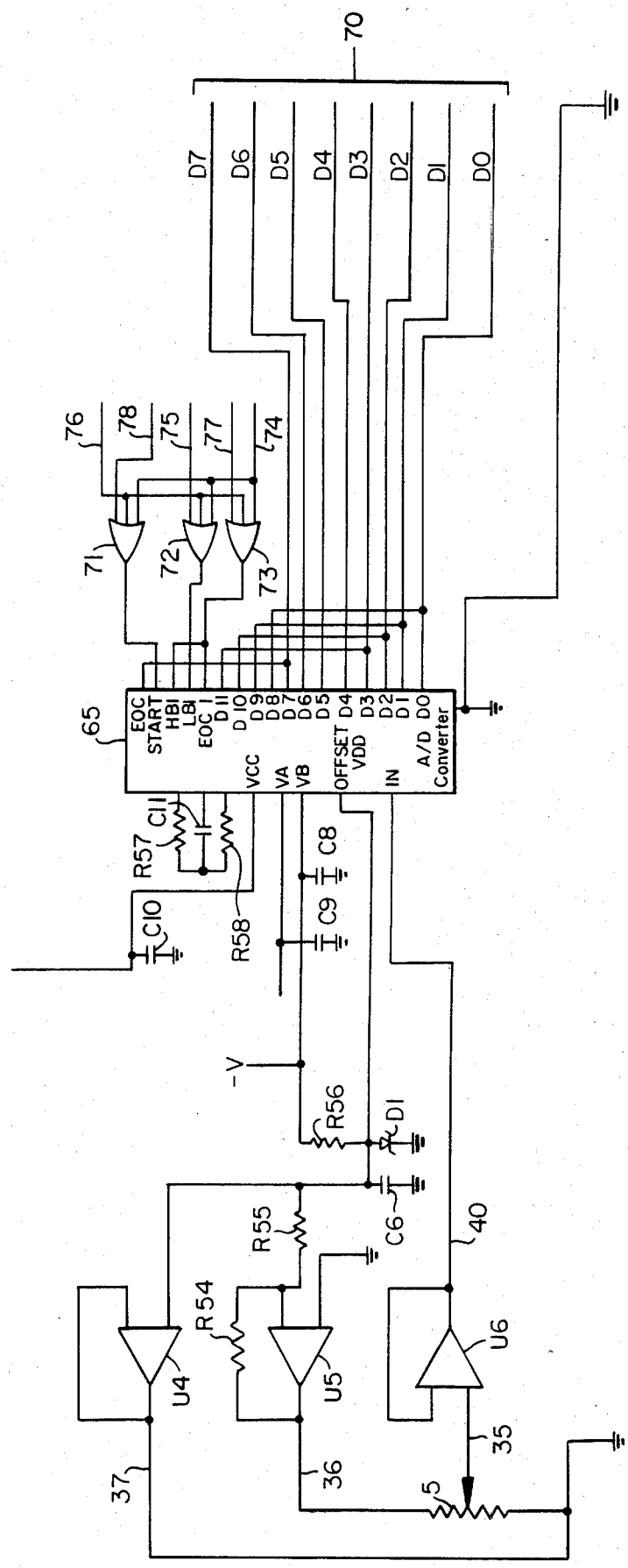
FIG. 4 shows the position transducer interface circuit between the microcomputer of FIG. 1 and the position transducer.

FIG. 4 shows the linear potentiometer interface circuit between the linear potentiometer 54 and the microcomputer 1. The linear potentiometer 54 may be readily mounted to the die casting machine with its variable wiper arm 35 connected to move with the reciprocating device. Accordingly, the position of the wiper arm 35 is directly proportional to the position of the reciprocating device along the stroke length. Since the velocity of the reciprocating device is equal to distance divided by time; the velocity is readily determined relative to each incremental stroke position. The stroke length may be divided into any number of increments with the velocity representing the differential of each reading with respect to time.

Linear potentiometer 54 is connected to the interface circuit operational amplifier U4, U5 and U6 respectively. Operational amplifiers U4 and U5 serve to apply positive and negative reference voltage levels across the opposite ends 36, 37 of the potentiometer 5. The operational amplifier U6 amplifies the signal output 38 from the wiper arm 35. Operational amplifier U4 and U6 are connected in a conventional unity gain configuration. Resistors R54 and R55 form a unity gain feedback circuit which generates a positive reference voltage on end 36 of potentiometer 54 equal in magnitude to the negative reference voltage developed by zener diode D1 from a negative power supply voltage −V through resistor R56. Accordingly, the output 40 of the operational amplifier U6 is automatically adjusted against drift in power supply voltage. The output 40 is connected to a conventional analog to digital converter 42 such as Beckman AD7556. The data presented on the data bus lines D0 through D7 are connected to the microcomputer 1. The A to D converter 42 generates a twleve bit digital signal corresponding to the analog signal 40. Nor gates 71, 72 and 73 control the conversion of data and the interrogation of the twelve bit output D0 through D11. Each time the microcomputer takes a reading the enable conversion line 74 goes to the zero logic state. At the same time, address lines 75 and 76 are set to a logical zero. When all three of the signals are logical zero's the output of Or gate 72 is a logical one thereby enabling the low byte labeled LBI in the A and D converter 42. This causes the lower significant bits D0 through D7 to be impressed upon the data bus lines B0 to B7. After reading the lower eight bits, the microcomputer 1 then interrogates the upper four bits D8 to D11 by setting the enable conversion line to a zero logic state while setting address lines 77 and 76 to logical zero. This combination causes the output of Or gate 73 to go to a logical one which, in turn, enables the end of Conversion Signal EocI and the high byte HBI causing the upper significant bits D8 to D11 to be impressed upon the data bus lines B0 to B3. The conversion of data is initiated when the microcomputer sets the enable conversion line 74 to a zero logic state and sets the address lines 78 and 76 to logical zero. This causes the output of Or gate 71 to go to a high state thereby impressing a start signal to the start input of the A to D converter 42 for starting another conversion cycle. By continuously repeating the start conversion and reading sequence in predetermined intervals corresponding to incremental distances the microcomputer 1 knows at all times what the position of the ram is along the machine stroke. Upon collecting the position data as a function of time it need only perform an algorithm representing a simple mathematical quotient of distance and time to convert the position data to velocity data. Accordingly, a profile can be generated corresponding to velocity versus position as well as velocity versus time or a combination of both. The latter is significant in that certain periods may exist when a momentary time display would be beneficial. In die casting this is true at approximately the end of the stroke where the velocity of the ram approaches zero. Accordingly, a combination display is particularly useful for the pressure profile in a die casting operation over the final stroke length known to those skilled in the art as the "biscuit" length.

Figure 5:
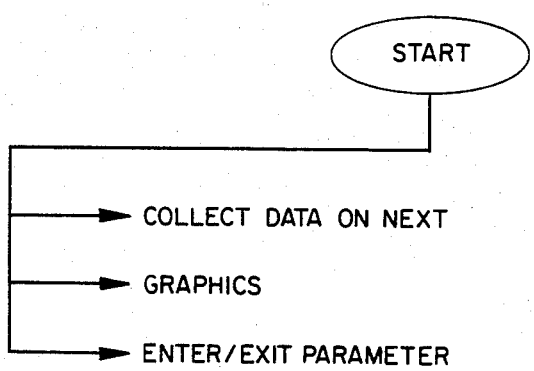
FIG. 5 is a flow diagram for the microprocessor of FIG. 1 corresponding to the start function.

FIG. 5 illustrated the flow diagram for start up of the microcomputer 1. Upon depressing the start function key three program selections identified as Collect Data, Graphics and Entry/Edit Parameter sheets become selectable. A program is selected by depressing one of the dedicated function keys corresponding to the program selection. Any one of the keys in the function key groups 8, 9 and 12 may be assigned the appropriate functions.

Figure 5A:
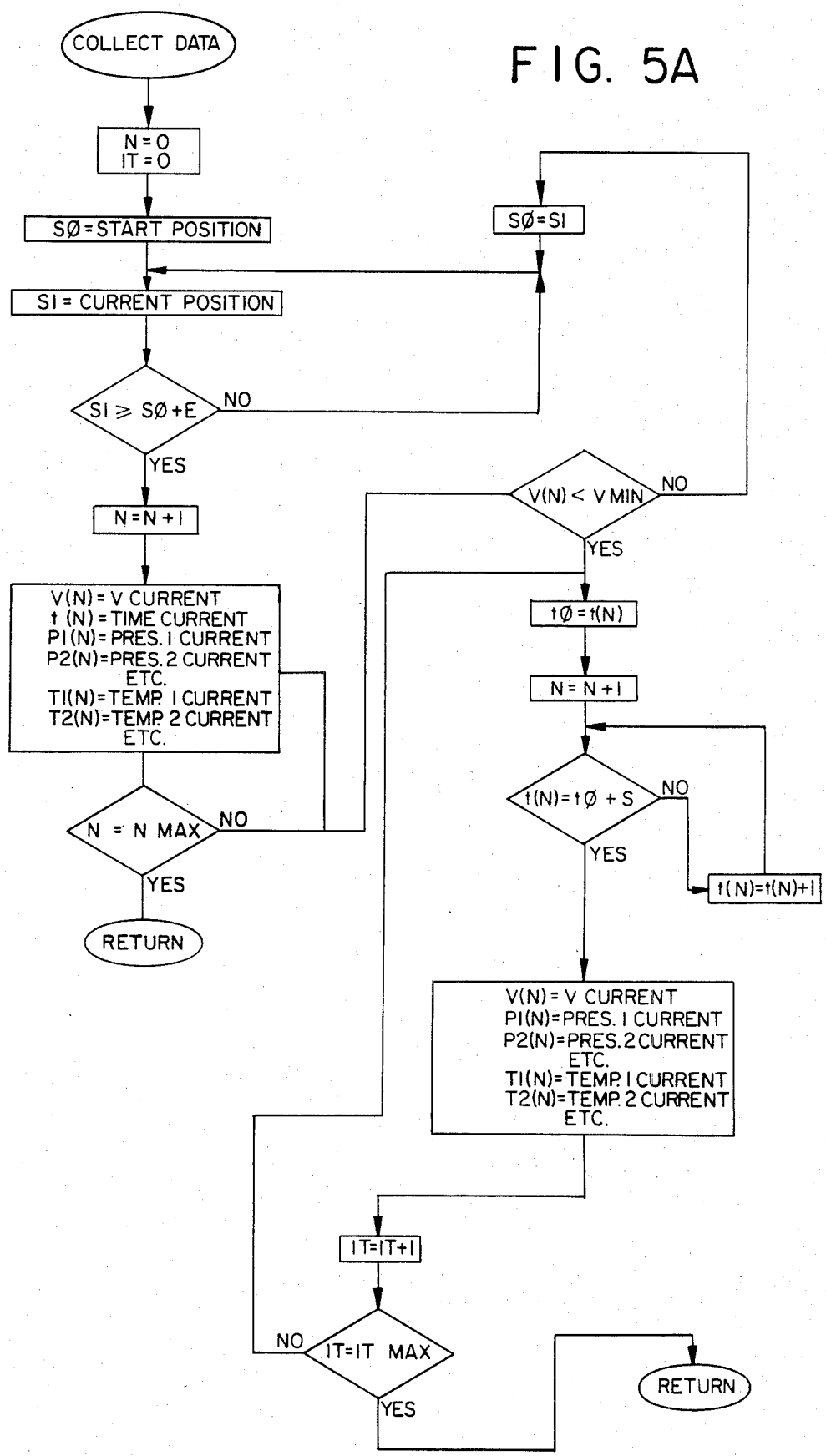
FIG. 5A is a flow diagram identifying the software functions for the program selection "Collect Data" in the flow diagram of FIG. 5.

FIG. 5A shows the flow diagram for the program selection "Collect Data". The letter (N) designates each incremental position at which data is to be collected over the stroke length. The stroke length may be divided into any fixed number of incremental data collection points preferably corresponding to the screen increments for the particular microcomputer being used. At each data collection point a time reading is taken with the number of the data points designated IT. The start position is labeled $S\phi$ at time $IT=\phi$ whereas the current position of the injection ram along the stroke length is designated SI. The algorithmic statement $SI \geq S\phi + E$ is met only when the ram has advanced from the start position a fixed distance E representing the desired incremental spacing between the incremental positions. Once this is met the incremental position N is advanced by one and a reading is taken from the transducers 2, 3, 4 or 5 of current velocity, current temperature, and current pressure. The microcomputer clock is used for generating a time frame.

The program of FIG. 5A provides for consecutive readings at each incremental position until the assigned number of incremental positions reaches maximum. In die casting near the end of the operation when the ram approaches the end of the stroke the velocity will drop to a plateau level of slightly above zero at which time it is preferred to continue readings as a function of time. Accordingly, as shown in FIG. 5A, a time frame is established for the remaining number of incremental positions with $t\phi$ representing the starting time for further consecutive readings as a function of time. As soon as the current time $t(N)$ plus a predetermined time increment "$\delta$" is reached representing a time data increment IT within the established time frame, from $t\phi$ to IT maximum, the next reading is taken. At such instant the time data increment IT is advanced by one and further readings are taken until the increments of time IT equal the completion of the established time frame.

Figure 6:
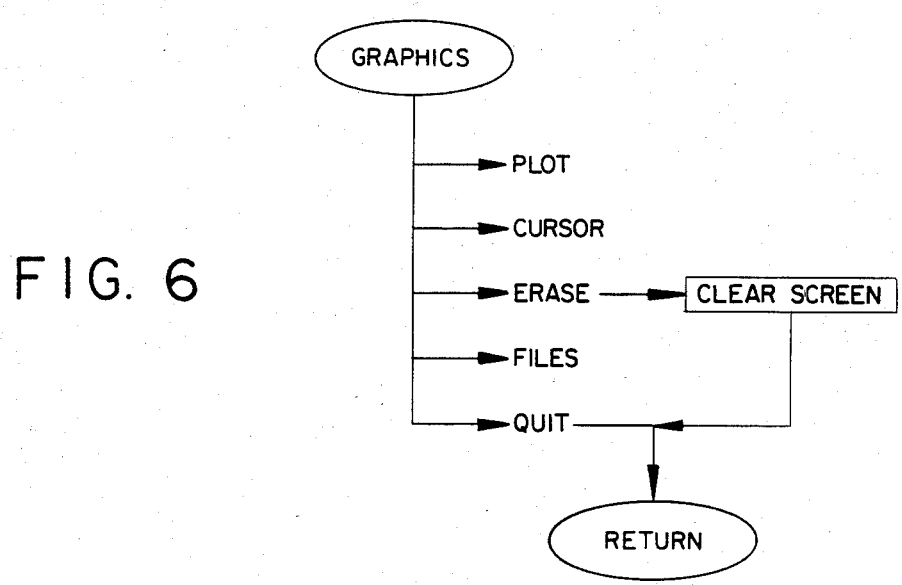
FIG. 6 is another flow diagram identifying the software functions for the "Graphics" program selection in the flow diagram of FIG. 5.

FIG. 6 shows the flow diagram for the program Selection Graphics. With this program selection the operator is given a further choice of the subordinated functions Plot, Cursor, Erase, Files and Quit. Any one of these functions become available upon depression of one of the assigned function keys 8. The Erase function clears the screen and return the program selection. The program selection menu is also returned upon depressing the quit function key.

Figure 6A:
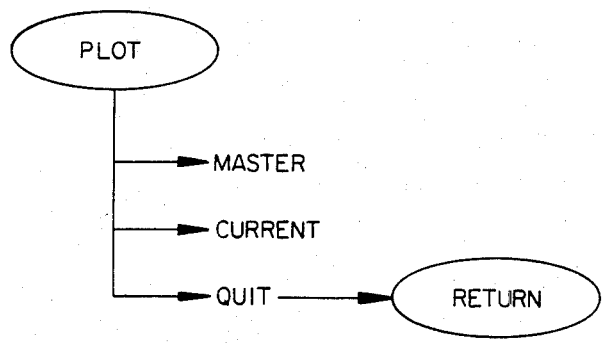
FIG. 6A is a flow diagram subroutine for performing the "Plot" function in the flow diagram of FIG. 6.
Figure 6B:
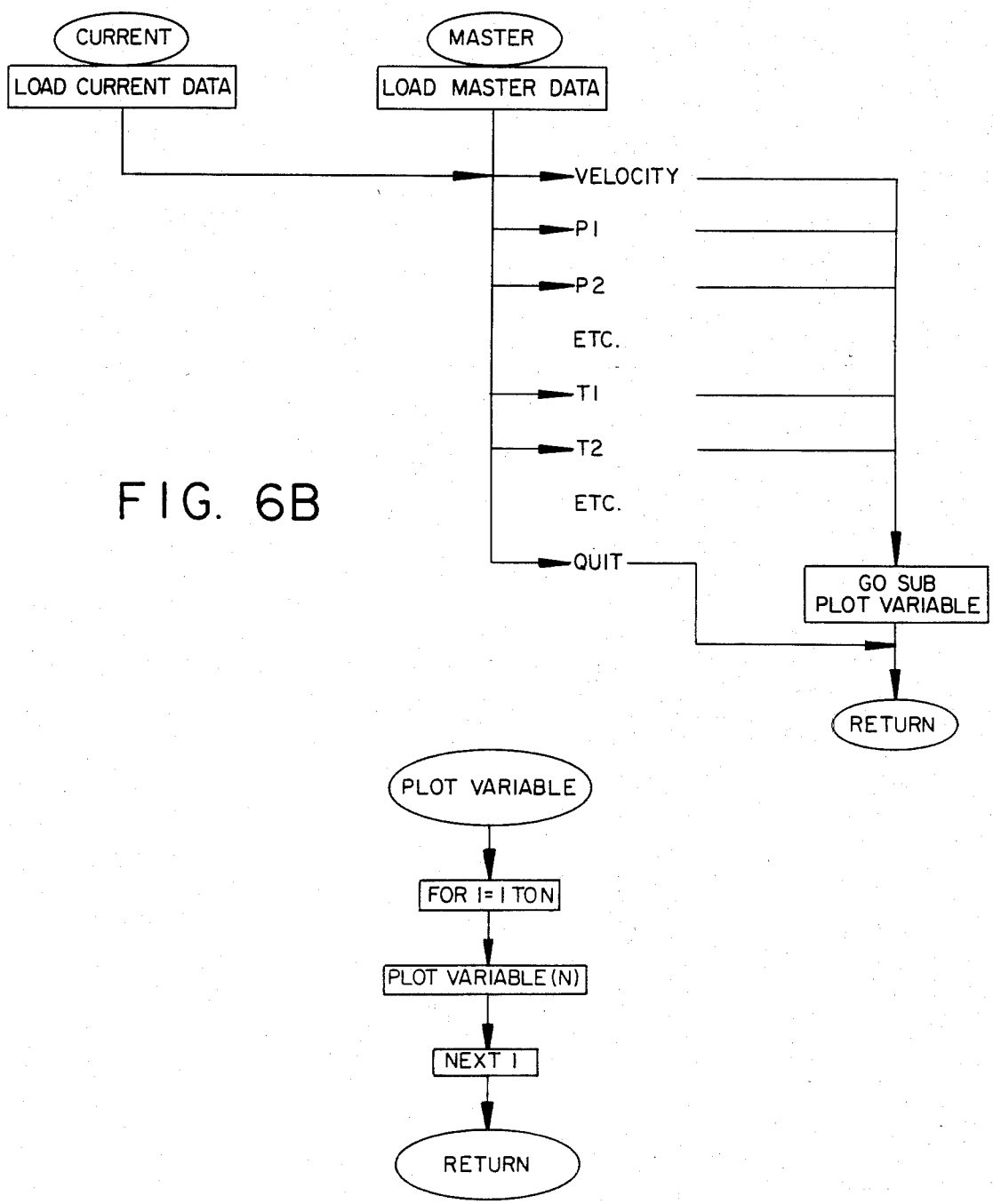
FIG. 6B is a flow diagram subroutine for performing the "Current", "Master" and "Plot Variable" subroutines of the Plot function of FIG. 6A.
Figure 6C:
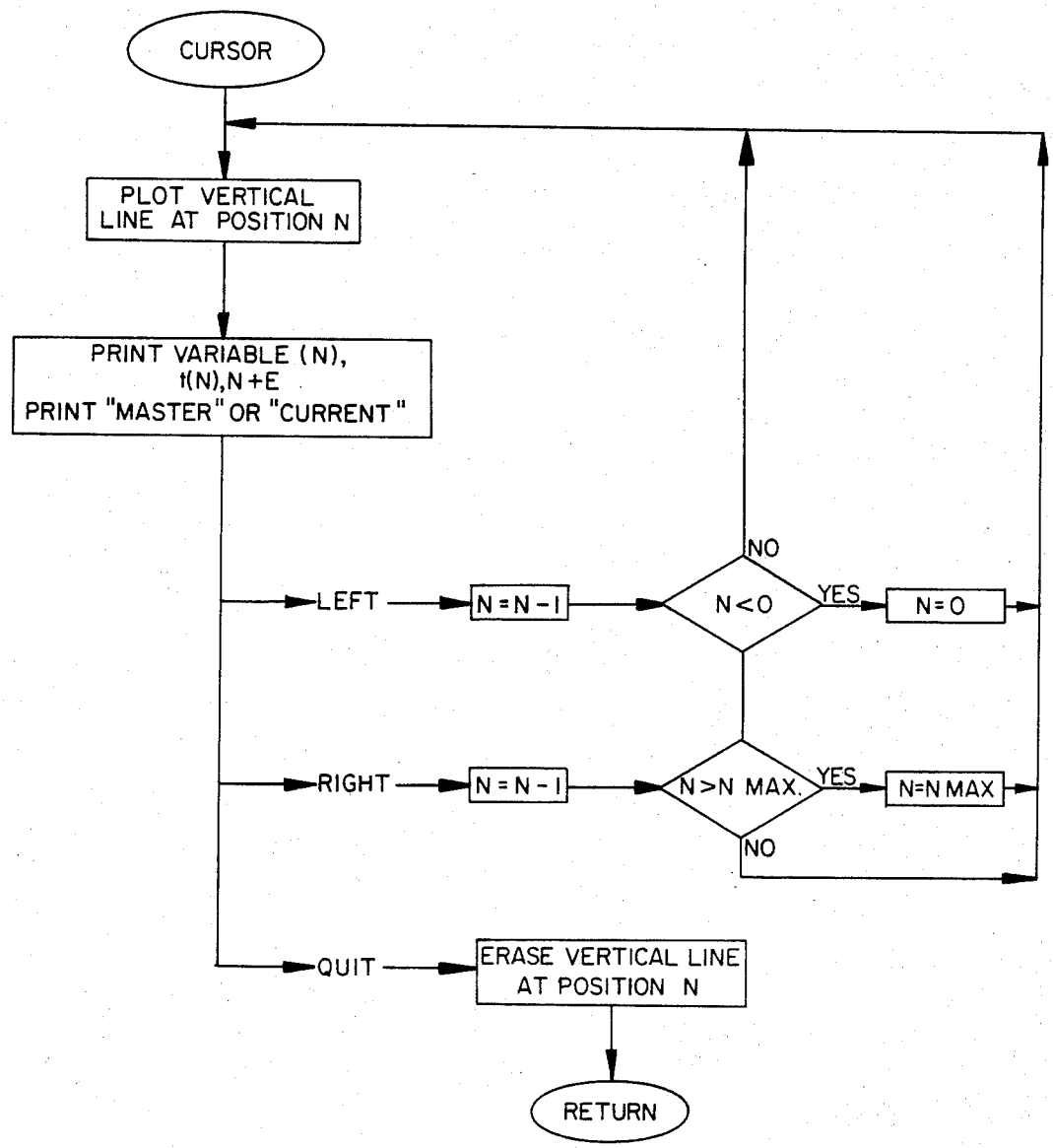
FIG. 6C is a flow diagram subroutine for performing the "Cursor" subroutine for the Cursor function of FIG. 6.

The Plot function is shown in FIG. 6A providing further selection of the subroutines Master or Current. FIG. 6B shows the flow diagram for both the master and current subroutine for the function selection Plot. The subroutine is the same whether current data or master data is plotted with the data of each of the variables loaded and plotted corresponding to each incremental position. The Cursor function flow diagram is shown in FIG. 6C. A vertical line is plotted at the existing incremental position on the CRT screen upon selection of the cursor with corresponding variables for the cursor position printed on the display for either a master or current profile. The cursor position is adjustable by the operator to either the left or right of the displayed cursor position by depression of the assigned dedicated function keys for cursor left or right control. The cursor will move in increments N preferably corresponding to the assigned incremental positions N for the stroke. Accordingly, the cursor position for one trace will automatically correspond to the same incremental position for a superimposed trace. As the flow diagram indicates the cursor may only be moved to the left or right to an incremental position which satisfies the statement defining the number of N positions.

Figure 6D:
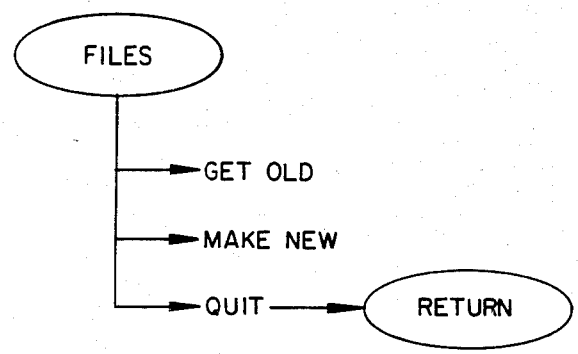
FIG. 6D is a flow diagram subroutine for performing the "Files" function in the flow diagram of FIG. 6.
Figure 6E:
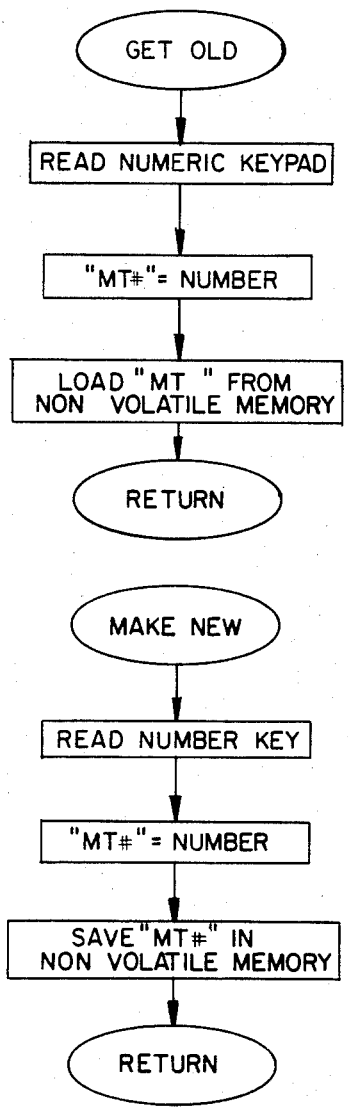
FIG. 6E is a flow diagram subroutine for performing the "Get Old" and "Make New" subroutines of the Files function of FIG. 6C.

In FIG. 6D the flow diagram for the function selection "Files is shown. The operator is provided with a further choice of subroutine selections "Get Old", "Make New", or "Quit". The subroutines Get Old and Make New is illustrated in FIG. 6E. The files selection "Get Old" corresponds to the selection of a master trace whereas the files selection "Make New" corresponds to the storing of current data in forming a master trace in the non-volatile memory 7. The address number for the old or new master trace in the non-volatile memory is designated by use of the numeric keypad.

Figure 7:
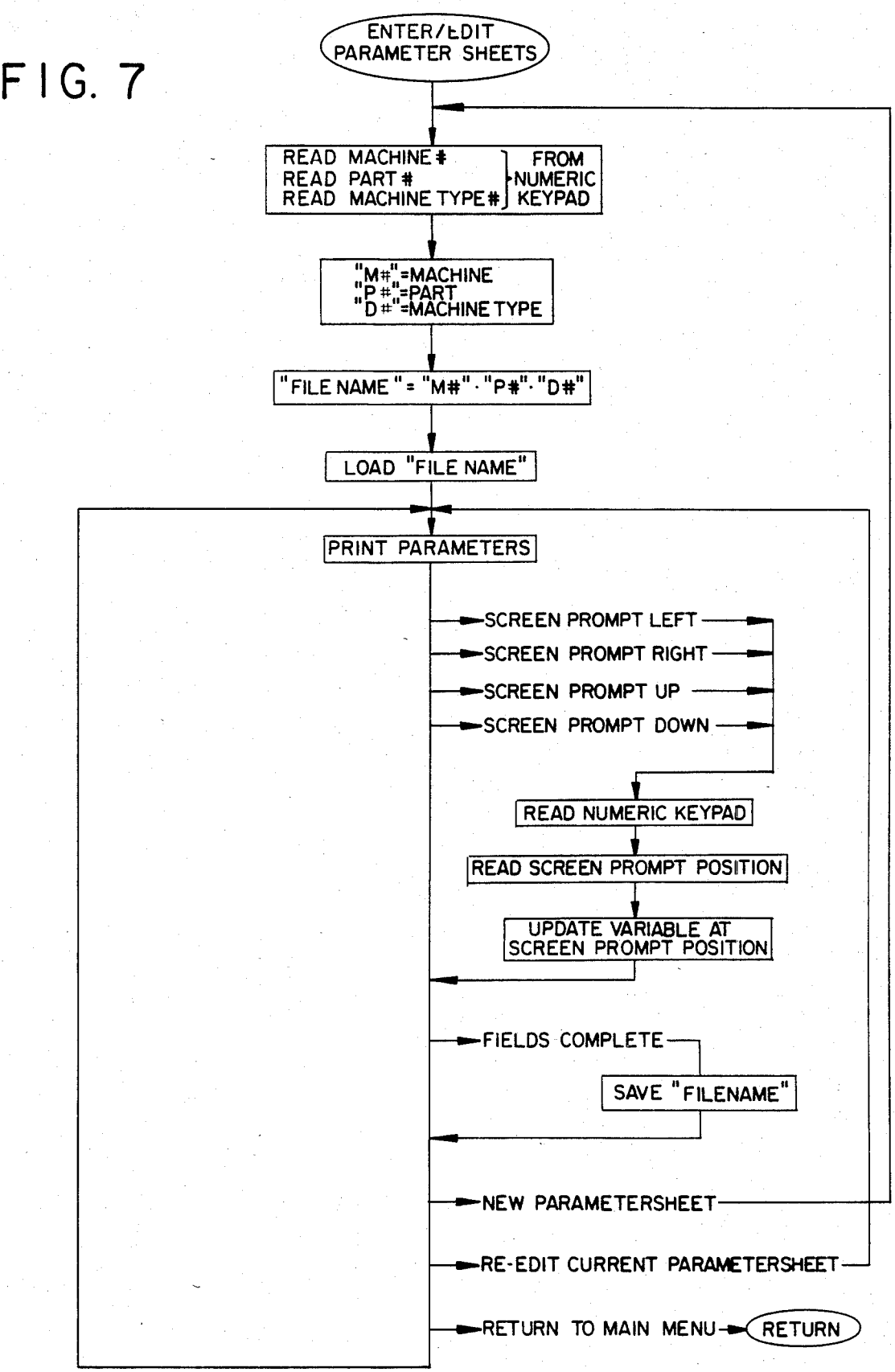
FIG. 7 is a flow diagram for carrying out the ENTER/EDIT PARAMETER SHEETS function in the flow diagram of FIG. 6.

The Enter/Edit Parameter Sheet program selection identified in the flow diagram for start up of the microcomputer 1 is shown in FIG. 7. The microcomputer 1 is instructed to go to the numeric keypad and wait for the operator to read in the numbers corresponding to the machine in use, the part in use and the machine type. The microcomputer assigns and constructs characters used for the file name. The parameters may then be printed out on the CRT screen. The screen prompt is adjustable to the left, right or up and down. The screen prompt refers to the flashing inverse video enhancement of the location on the CRT screen which the computer is currently monitoring. The user may at any time depress Fields complete to save the File name. The parameter sheet program may also be used to print out acceptable high and low limit settings.

What is claimed is:

1. A diagnostic method for analyzing and monitoring the process parameters of a die casting operation in which a linear reciprocating injection device is traversed over a fixed stroke length at high speed comprising the steps of:
    (a) dividing said stroke length into a predetermined multiple number of incremental positions;
    (b) generating analog data corresponding to at least the position of said injection device and the pressure developed by said injection device at each such incremental position;
    (c) recording the time transpired in the movement of said injection device along said stroke length;
    (d) calculating the velocity of said injection device at such incremental position by dividing the traversed distance between incremental positions with the transpired differential in time between said positions;
    (e) graphically displaying the data corresponding to pressure and velocity on a display screen of a cathode ray tube as a function of the incremental position of said injection device along said stroke length until said velocity reaches a predetermined minimum level, with said display forming a master profile for said data;

(f) storing the data representing said master profile at a predetermined address location in a nonvolatile memory of a microcomputer;

(g) repeating the sequence of generating, calculating and storing analog data corresponding to pressure and velocity as a function of stroke position for a second die casting operating to form a current profile of such data for such second operation, and (h) displaying said current profile on said display screen along with said master profile for diagnostic comparison purposes.

2. A diagnostic method as defined in claim 1 further comprising detecting when said predetermined minimum velocity level is reached and graphically displaying the analog data of pressure and velocity in step (e) as a function of time upon reaching said minimum velocity level and until said stroke length is completed.

3. A diagnostic method as defined in claim 2 wherein said minimum velocity level is a velocity of approximately zero.

4. A diagnostic method as defined in claim 3 herein upon detecting said minimum velocity level said analog data is displayed as a function of time by establishing a time frame for the number of incremental positions remaining after said minimum velocity level is reached, dividing said time frame into incremental time increments and recording said analog data at each of said time increments until the increments of time equal the completion of the time frame.

5. A diagnostic method as defined in claim 4 wherein the temperature is recorded at each incremental position along the stroke length and is graphically displayed in step (e) along with said pressure and velocity and stored as master profile data in step (f).

6. A diagnostic method as defined in claim 5 further comprising programming the microcomputer in which said master profile data is stored to generate a cursor in the form of a vertical line upon said CRT display at any one of the incremental positions along said stroke length; adjusting the position of said line cursor to a desired position in increments corresponding to distance between said incremental positions; and displaying the data of pressure and velocity on said CRT screen corresponding to the adjusted position of said line cursor.

* * * * *